United States Patent
Deshpande et al.

(10) Patent No.: US 9,952,877 B2
(45) Date of Patent: Apr. 24, 2018

(54) BOOTING A PHYSICAL DEVICE USING CUSTOM-CREATED FROZEN PARTIALLY-BOOTED VIRTUAL MACHINES

(71) Applicants: Akash R. Deshpande, San Jose, CA (US); Michael E. Lipman, Harvard, MA (US); Peter Weinberger, Basel (CH)

(72) Inventors: Akash R. Deshpande, San Jose, CA (US); Michael E. Lipman, Harvard, MA (US); Peter Weinberger, Basel (CH)

(73) Assignee: Cisco Technology, Inc., San Jose, CA (US)

( * ) Notice: Subject to any disclaimer, the term of this patent is extended or adjusted under 35 U.S.C. 154(b) by 94 days.

(21) Appl. No.: 14/259,444

(22) Filed: Apr. 23, 2014

(65) Prior Publication Data
US 2015/0309805 A1    Oct. 29, 2015

(51) Int. Cl.
*G06F 9/4401* (2018.01)
*G06F 9/44* (2018.01)
*G06F 9/455* (2018.01)

(52) U.S. Cl.
CPC ........ *G06F 9/4401* (2013.01); *G06F 9/45558* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 7,383,541 B1 * | 6/2008 | Banks | G06F 8/65 717/126 |
| 7,577,722 B1 * | 8/2009 | Khandekar | G06F 9/45558 709/220 |

(Continued)

OTHER PUBLICATIONS

"Understanding virtual machine snapshots in VMware ESXi and ESX (1015180)," Aug. 1, 2012, available at http://kb.vmware.com/selfservice/microsites/search.do?language=en_US&cmd=displayKC&externalId=1015180, VMware, Inc., Palo Alto, CA (four pages).

(Continued)

*Primary Examiner* — Paul J Yen
(74) *Attorney, Agent, or Firm* — The Law Office of Kirk D. Williams

(57) ABSTRACT

In one embodiment, a physical device (e.g., packet switching device, computer, server) is booted using custom-created frozen partially-booted virtual machines, avoiding the time required for an end-to-end boot process. In one embodiment while the system is operating under a current version, a partially-booted virtual image of a new operating version for each of multiple processing elements of the device is produced according to static configuration information specific to the device, with each of these partially-booted virtual machines frozen. The device is rebooted to a fully operational device by unfreezing these partially-booted virtual machines, thus removing this portion of a boot process from the real-time booting of the device. The generation of the frozen partially-booted virtual machines is advantageously performed by the device itself based on current static configuration information and the availability of the specific hardware configuration of the device.

17 Claims, 4 Drawing Sheets

(56) References Cited

U.S. PATENT DOCUMENTS

| | | | |
|---|---|---|---|
| 2006/0184937 A1* | 8/2006 | Abels | G06F 8/65 718/1 |
| 2012/0005367 A1* | 1/2012 | Bettink | H04L 47/41 709/233 |
| 2013/0061090 A1* | 3/2013 | Lee | G06F 11/1417 714/16 |
| 2013/0114613 A1 | 5/2013 | Deshpande et al. | |
| 2013/0191340 A1 | 7/2013 | Ammanur et al. | |
| 2013/0247038 A1* | 9/2013 | Luo | G06F 9/45533 718/1 |
| 2014/0108776 A1* | 4/2014 | Miyauchi | G06F 9/45558 713/2 |
| 2014/0324407 A1* | 10/2014 | Chen | G06Q 10/00 703/13 |
| 2014/0330948 A1* | 11/2014 | Dunn | H04L 41/0813 709/221 |
| 2015/0227192 A1* | 8/2015 | Kruglick | 713/323 |

OTHER PUBLICATIONS

"About Virtual Machine Snapshots," 2012, available at http://technet.microsoft.com/en-us/library/dd851843, Microsoft Corp., Redmond, WA (one page).

"Hyper-V Virtual Machine Snapshots: FAQ," Mar. 21, 2012, available at http://technet.microsoft.com/en-us/library/dd560637(WS.10).aspx, Microsoft Corp., Redmond, WA (two pages).

* cited by examiner

BOOTING A PHYSICAL DEVICE USING CUSTOM-CREATED FROZEN PARTIALLY-BOOTED VIRTUAL MACHINES

TECHNICAL FIELD

The present disclosure relates generally to packet switching devices forwarding packets in a communications network and other devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

From time to time, the software running in packet switching devices needs to be upgraded or rebooted. However, this is problematic as rebooting a packet switching device to a same or upgraded version can take a long time during which time the packet switching device is unavailable to switch packets. This rebooting of a packet switching device impacts service provider business by reducing the availability of their networks, thereby affecting the Service Level Agreements with their customers.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
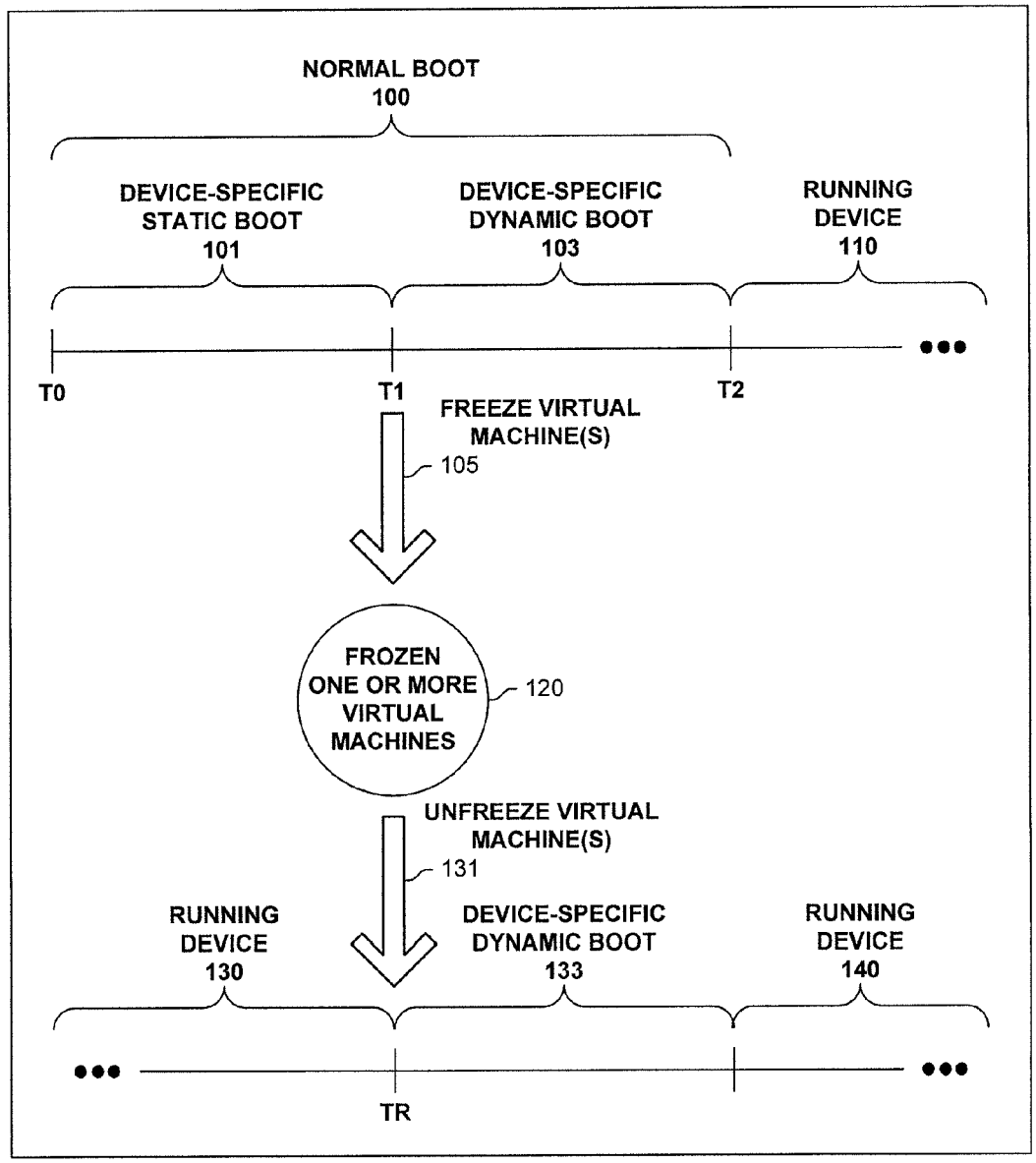
FIG. 1 illustrates process according to one embodiment.

Disclosed are, inter alia, methods, apparatus, computer-storage media, mechanisms, and means associated with booting a physical device using custom-created frozen partially-booted virtual machines. In one embodiment, a device is operated with each of one or more of processing elements of the device operating according to a corresponding current virtual machine. A corresponding partially-booted virtual image for each of said one or more processing elements is produced according to configuration information specific to the device, with each of said one or more of corresponding partially-booted virtual machines frozen. The device is rebooted from the corresponding partially-booted virtual machines to a fully operational device including each of said one or more processing elements running from an unfrozen said corresponding partially-booted virtual machine. In one embodiment, the device is a packet switching device (e.g., router). One embodiment simulates, by the device itself or an external device (e.g., network management or operations system), a partial custom booting of the device in said producing the corresponding partially-booted virtual image for each of said one or more processing elements according to configuration information specific to the device. In one embodiment, this simulation is performed in parallel while the device is operating. In one embodiment, this process is used to change the operating version of the device.

2. Description

Disclosed are, inter alia, methods, apparatus, computer-storage media, mechanisms, and means associated with booting a physical device using custom-created frozen partially-booted virtual machines. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

FIG. 1 illustrates a process performed in one embodiment by a device (e.g., computer, server, router or other packet switching device) that uses virtual machines. The device is normally booted (100) taking from time T0 to time T2, after which the device is booted into a running system (110). A boot process can typically be split into two phases: a device-specific static boot process (101) and a device-specific dynamic boot process (103).

In one embodiment, a device-specific static boot process (101) of a packet switching device includes scanning a bus to determine the hardware configuration of the device (e.g., number of network processors, size of memory, size of content-addressable memories), creating memory images for loading into memory and content-addressable memory for performing lookup operations, initializing queues, etc. In one embodiment, a device-specific dynamic boot process (103) includes communicating with peer devices to determine the configuration of a network, and packet routing and/or forwarding information.

In one embodiment, after the device-specific boot (101) is performed as part of a normal boot process (100), a copy of the virtual machines of the processing elements are frozen (105, 120) then the device-specific dynamic boot process (103) continues.

These frozen virtual machines (12) can be used to reduce the reboot time of a device as shown at the bottom of FIG. 1. The system of the device is running (130). At time TR, a reboot is initiated. The current virtual machines are stopped and the frozen virtual machines (120) are instantiated/unfrozen (131) onto corresponding processing elements of the device. The device-specific dynamic boot process (133) continues from there to produce a fully operational running system (140). In one embodiment, the time required for performing a device-specific static boot (101) is eliminated after it is performed once (e.g., by the device itself or even simulated by another device).

Figure 2:
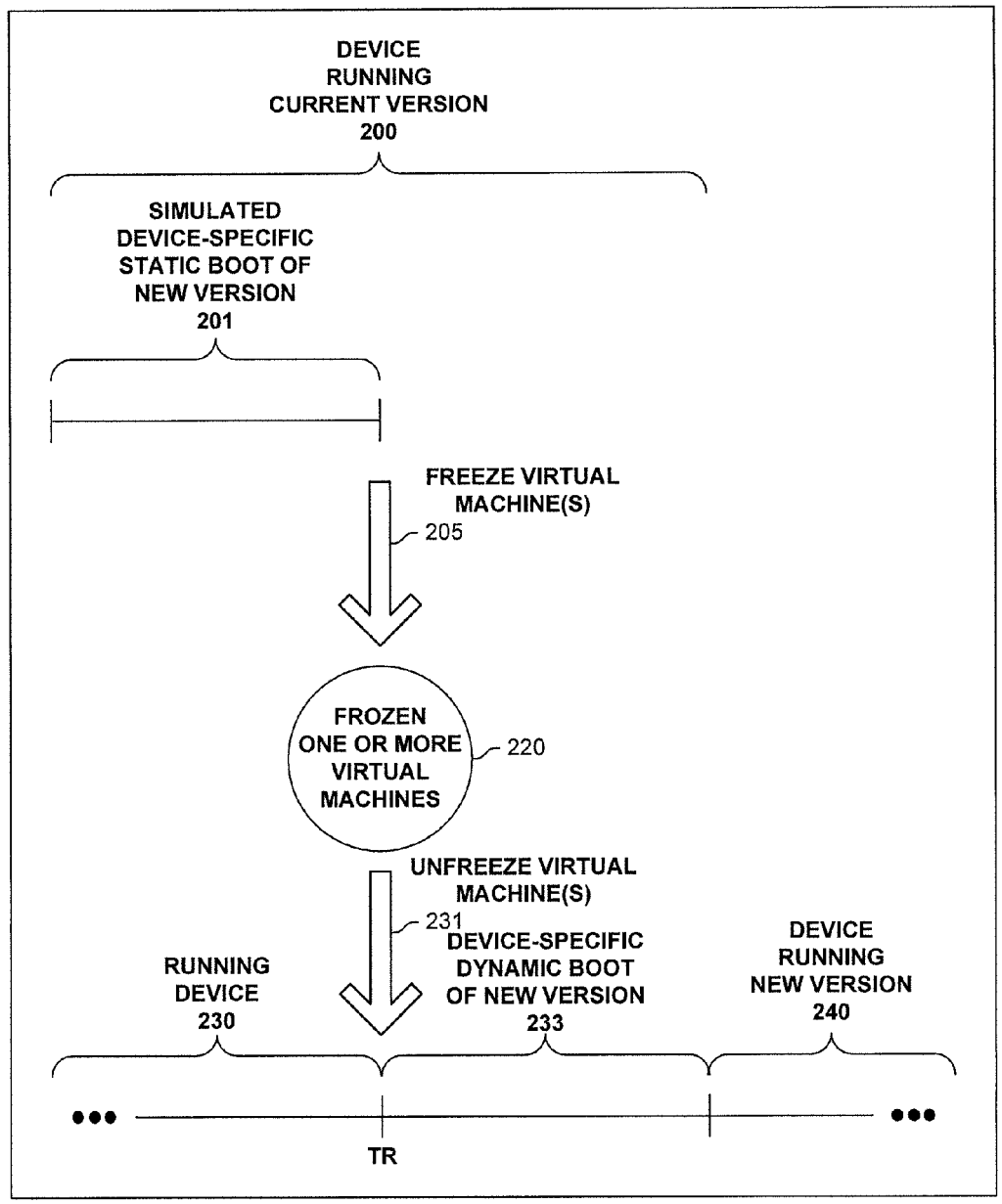
FIG. 2 illustrates process according to one embodiment.

FIG. 2 illustrates the use of simulation to produce the frozen virtual machines (220). Typically, but not always, this device-specific static boot simulation (201) occurs while the device is operating (200). In one embodiment, a reboot is desired to clean up issues with the current running system. In one embodiment, a reboot is necessary to change from a current operating version to a different operating version.

In one embodiment, simulated device-specific static boot (201) is performed by the device itself, either in a centralized location (e.g., on a route processor, service card), or distributed throughout the device, such as, but not limited to, by the individual processing elements that will run the virtual machines. In one embodiment, simulated device-specific static boot (201) is performed by a network management or operation system. This static boot simulation is device-specific, as it specially directed to the configuration of the device (e.g., number of processing elements, size of memory, size of content-addressable memory, configuration of physical interfaces, firmware upgrades, switching fabric interfaces, etc.). Additionally, by performing this simulation while the device is operating (200), the latest static configuration information (e.g., from configuration files) is used in producing the frozen virtual machines 220, which can be according to a same operating version or different operating version than the current version of the operating device (200).

As represented at the bottom of FIG. 2, the device is currently running (230). Reference number 230 is used to indicate that it could be the same operating virtual machines of running device (200) or the device subsequently rebooted. At time TR, a reboot is initiated. The current virtual machines are stopped and the frozen virtual machines are instantiated/unfrozen (231) onto corresponding processing elements of the device. The device-specific dynamic boot process (233) continues from there to produce a fully operational running system (240). In one embodiment, the time required for performing a device-specific static boot (201) is eliminated from the real-time booting of the device. In one embodiment, the device operating after the reboot (240) is operating under a different system version than the device operating prior to the reboot (230).

An example reboot process of a packet switching device includes shutting down the running virtual machines, booting from the operating system, starting the application processes, consuming the static configuration in the route processor, distributing and applying static configuration in the line cards, acquiring dynamic configuration in the route processors, and distributing and applying dynamic configuration. Eliminating or reducing the device-specific static boot (201) portion of a reboot directly affects the unavailability of the device.

Figure 3A:
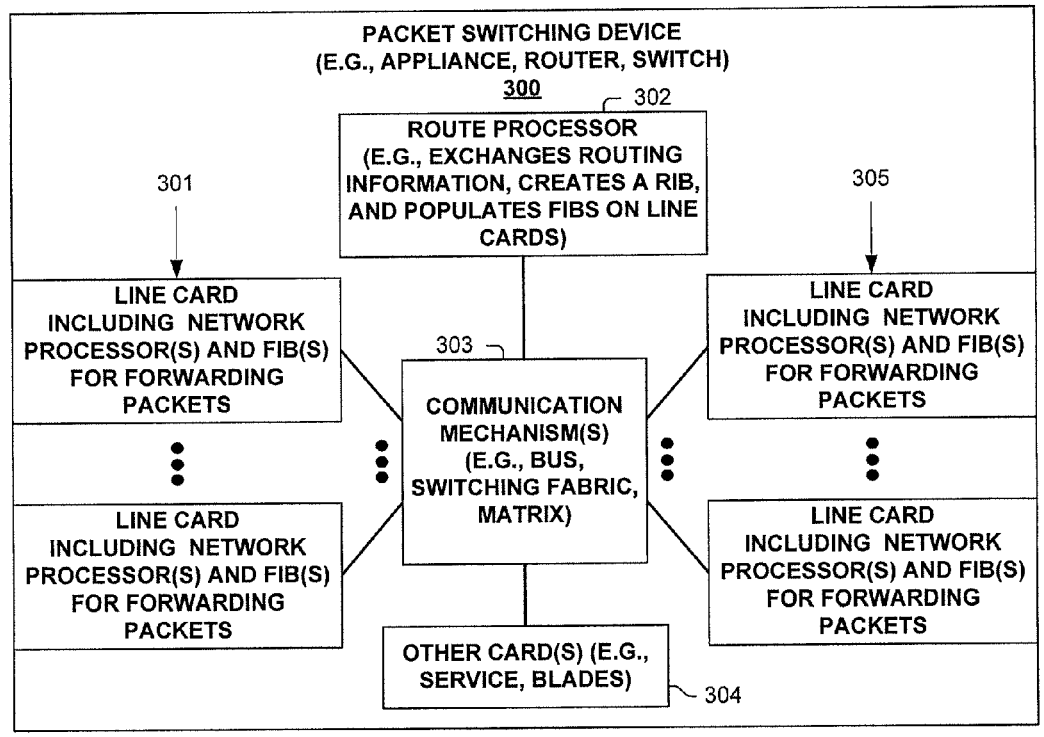
FIG. 3A illustrates a packet switching device according to one embodiment.

One embodiment of a packet switching device 300 is illustrated in FIG. 3A. As shown, packet switching device 300 includes multiple line cards 301 and 305, each with one or more network interfaces for sending and receiving packets over communications links (e.g., possibly part of a link aggregation group), and with one or more processing elements that are used in one embodiment associated with booting a physical device using custom-created frozen partially-booted virtual machines. Packet switching device 300 also has a control plane with a route processor 302 (e.g., board with processing elements) for managing the control plane and/or control plane processing of packets associated with booting a physical device using custom-created frozen partially-booted virtual machines. Packet switching device 300 also includes other cards 304 (e.g., service cards, blades) which include processing elements that are used in one embodiment to process packets associated with booting a physical device using custom-created frozen partially-booted virtual machines, and some communication mechanism 303 (e.g., bus, switching fabric, matrix) for allowing its different entities 301, 302, 304 and 305 to communicate.

Line cards 301 and 305 typically perform the actions of being both an ingress and egress line card, in regards to multiple other particular packets and/or packet streams being received by, or sent from, packet switching device 300. In one embodiment, line cards 301 and/or 305 perform synchronization processing for packets of a packet stream corresponding to the synchronization label received in a packet. In one embodiment, a synchronization label refers to one or more labels in a label stack of a packet.

Figure 3B:
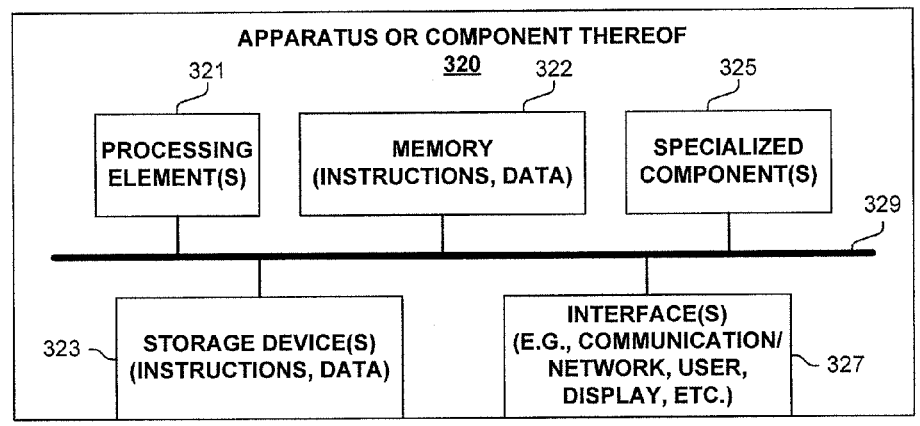
FIG. 3B illustrates an apparatus according to one embodiment.

FIG. 3B is a block diagram of an apparatus 320 used in one embodiment associated with booting a physical device using custom-created frozen partially-booted virtual machines. In one embodiment, apparatus 320 performs one or more processes (which may include synchronization processing), or portions thereof, corresponding to one of the flow diagrams illustrated or otherwise described herein, and/or illustrated in another diagram or otherwise described herein.

In one embodiment, apparatus 320 includes one or more processing element(s) 321, memory 322, storage device(s) 323, specialized component(s) 325 (e.g. optimized hardware such as for performing lookup and/or packet processing operations, etc.), and interface(s) 327 for communicating information (e.g., sending and receiving packets, user-interfaces, displaying information, etc.), which are typically communicatively coupled via one or more communications mechanisms 329, with the communications paths typically tailored to meet the needs of a particular application.

Various embodiments of apparatus 320 may include more or fewer elements. The operation of apparatus 320 is typically controlled by processing element(s) 321 using memory 322 and storage device(s) 323 to perform one or more tasks or processes. Memory 322 is one type of computer-readable/computer-storage medium, and typically comprises random access memory (RAM), read only memory (ROM), flash memory, integrated circuits, and/or other memory components. Memory 322 typically stores computer-executable instructions to be executed by processing element(s) 321 and/or data which is manipulated by processing element(s) 321 for implementing functionality in accordance with an embodiment. Storage device(s) 323 are another type of computer-readable medium, and typically comprise solid state storage media, disk drives, diskettes, networked services, tape drives, and other storage devices. Storage device(s) 323 typically store computer-executable instructions to be executed by processing element(s) 321 and/or data which is manipulated by processing element(s) 321 for implementing functionality in accordance with an embodiment.

Figure 4:
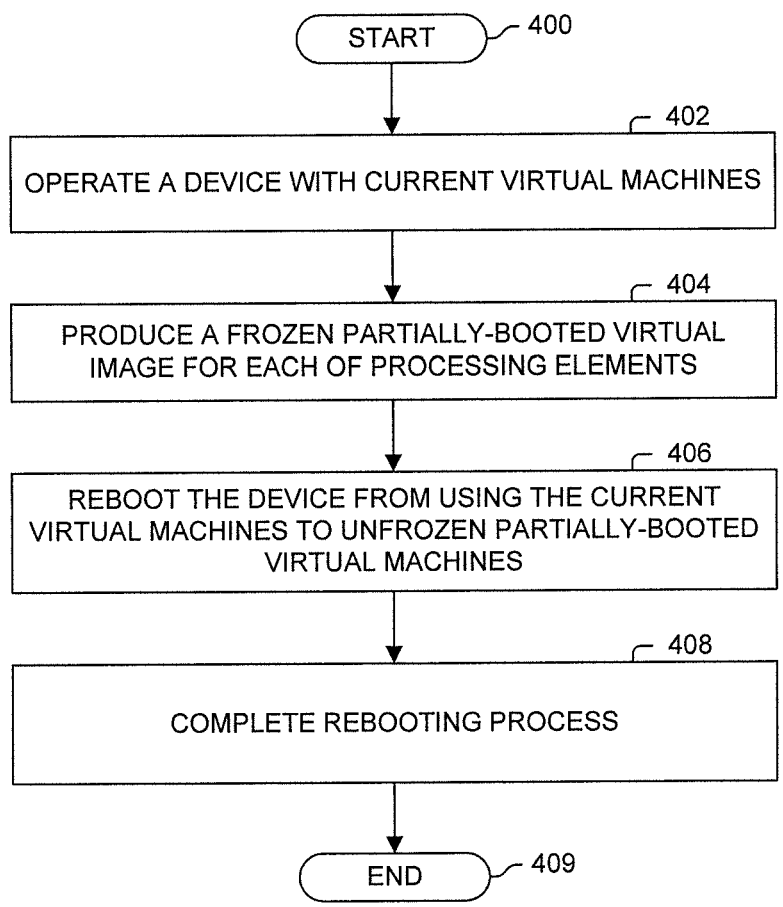
FIG. 4 illustrates a process according to one embodiment.

FIG. 4 illustrates a process performed in one embodiment. Processing begins with process block 400. In process block 402, a device is operated with current virtual machines on one or more of its processing elements on top of corresponding hypervisor(s). In process block 404, a frozen partially-booted virtual image of the virtual machines is produced for each of these processing elements via simulation (e.g., by the device itself or another device). In process block 406, the device is rebooted from the system with the current virtual machines to the instantiated/unfrozen virtual machines (operating under a same or new system version). In process block 408, the rebooting process of the device is completed. Processing of the flow diagram of FIG. 4 is complete as indicated by process block 409.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   booting a device into a fully operational running system, including each of one or more of processing elements of the device operating according to a corresponding current virtual machine;
   while the device is operating the fully operational running system and based on the latest configuration information of the device, the device simulating a partial custom booting of the device in producing a frozen corresponding partially-booted virtual image for each of said one or more processing elements; and
   rebooting the device using the frozen corresponding partially-booted virtual image for each of said one or more processing elements into a second fully operational running system.

2. The method of claim 1, wherein said one or more of processing elements includes at least two processing elements located on different cards or boards within the device.

3. The method of claim 1, wherein the fully operational running system and the second fully operational running system operate according to a same system version.

4. The method of claim 1, wherein the fully operational running system and the second fully operational running system operate according to different system versions.

5. A method, comprising:
   booting a packet switching device into a fully operational running system, with the packet switching device including a plurality of processing elements distributed within the packet switching device including on each of a plurality of line cards and a route processor, and with each of the plurality of processing elements operating according to a corresponding current virtual machine;
   producing a frozen corresponding partially-booted virtual image for each of the plurality of processing elements according to latest configuration information specific to the packet switching device via simulation of a partial custom booting of the packet switching device operation;
   rebooting the packet switching device, using the frozen corresponding partially-booted virtual image for each of the plurality of processing elements, into a second fully operational running system.

6. The method of claim 5, wherein said simulating the partial custom booting of the packet switching device is performed by the route processor or an application processor within the packet switching device.

7. The method of claim 5, wherein said simulating the partial custom booting of the packet switching device is performed using each of the plurality of processing elements of the packet switching device.

8. The method of claim 5, wherein said simulating the partial custom booting of the packet switching device is performed by the packet switching device in parallel with said operating the packet switching device as the fully operational running system.

9. The method of claim 5, wherein the fully operational running system and the second fully operational running system operate according to a different system version.

10. The method of claim 5, wherein said producing the frozen corresponding partially-booted virtual image for each of the plurality of processing elements includes scanning a bus of the packet switching device in determining a current hardware configuration of the packet switching device which includes discovering of at least one of the plurality of processing elements.

11. The method of claim 5, wherein at least one of said frozen corresponding partially-booted virtual machines includes a memory image for loading into memory by a corresponding at least one of the plurality of processing elements.

12. The method of claim 5, wherein said producing the frozen corresponding partially-booted virtual image for each of the plurality of processing elements includes scanning the packet switching device to determine a hardware configuration of the packet switching device, with the hardware configuration including a number of network processors, size of memory, and size of one or more content-addressable memories.

13. The method of claim 1, wherein said simulation includes a device-specific static boot simulation of the device.

14. A packet switching device, comprising:
one or more packet switching mechanisms;
a route processor including at least one processing element; and
a plurality of line cards, each including at least one processing element and interfaces that send and receive packets, with each of the plurality of line cards and the route processor communicating packets among themselves via said packet switching mechanisms; wherein the packet switching device performs operations, including:
booting the packet switching device into a fully operational running system, with each of said processing elements operating according to corresponding current virtual machine;
producing a frozen corresponding partially-booted virtual image for each of said processing elements according to latest configuration information specific to the packet switching device via simulating a partial custom booting of the packet switching device; and
rebooting the packet switching device, using the frozen corresponding partially-booted virtual image for each of said processing elements, into a second fully operational running system.

15. The packet switching device of claim 14, wherein said simulating the partial custom booting of the packet switching device is performed by the route processor or an application processor within the packet switching device.

16. The packet switching device of claim 14, wherein said simulating the partial custom booting of the packet switching device is performed using each of the plurality of processing elements of the packet switching device.

17. The packet switching device of claim 14, wherein said simulating the partial custom booting of the packet switching device is performed by the packet switching device in parallel with said operating the packet switching device as the fully operational running system.

* * * * *